(12) United States Patent
Kasahara

(10) Patent No.: US 7,090,611 B2
(45) Date of Patent: Aug. 15, 2006

(54) POWER TRANSMISSION DEVICE

(76) Inventor: Fumio Kasahara, 467, Yashiki, Higashibessho-cho, Anjou-shi Aichi (JP) 466-0013

( * ) Notice: Subject to any disclaimer, the term of this patent is extended or adjusted under 35 U.S.C. 154(b) by 0 days.

(21) Appl. No.: 11/283,598

(22) Filed: Nov. 18, 2005

(65) Prior Publication Data
US 2006/0073934 A1 Apr. 6, 2006

Related U.S. Application Data

(63) Continuation of application No. PCT/JP2004/007192, filed on May 26, 2004.

(30) Foreign Application Priority Data
May 28, 2003 (JP) .............................. 2003-150328

(51) Int. Cl.
B63H 20/14 (2006.01)
(52) U.S. Cl. .................... 475/331; 440/75; 440/61 S
(58) Field of Classification Search ................. 440/53, 440/61 S, 75; 475/331
See application file for complete search history.

(56) References Cited

U.S. PATENT DOCUMENTS

| | | | |
|---|---|---|---|
| 3,094,967 A * | 6/1963 | Willis, Jr. .................... 440/58 |
| 3,511,209 A * | 5/1970 | Becker ........................ 440/58 |
| 3,678,879 A * | 7/1972 | Morimoto .................... 440/63 |
| 4,016,825 A * | 4/1977 | Pichl ........................ 440/88 R |
| 4,726,257 A * | 2/1988 | Nelson ....................... 475/330 |
| 5,024,639 A | 6/1991 | Crispo | |
| 5,030,149 A * | 7/1991 | Fujita ......................... 440/75 |

FOREIGN PATENT DOCUMENTS

| FR | 1 557 934 | | 2/1969 | |
| JP | 1 127490 A | | 5/1989 | |
| JP | 1-273790 | * | 11/1989 | ................. 440/75 |
| JP | 9-189346 A | | 7/1997 | |
| JP | 3012417 B2 | | 12/1999 | |

* cited by examiner

Primary Examiner—Ha Ho
(74) Attorney, Agent, or Firm—Darby & Darby

(57) ABSTRACT

Mutual interference between rotation and turning drive forces is prevented by a simple structure. A transmission shaft and a turning body are supported at a housing so as to be relatively coaxially rotatable. An input shaft is connected to the transmission shaft, and a first sun gear is fixed thereon. First planetary gears meshing with the first sun gear are supported at a rotating body, which is connected to an output shaft. A second sun gear is provided on a hollow-cylindrical shaft fixed to the housing. Second planetary gears supported at the turning body mesh with the second sun gear. A first and second inner gears mesh with the first and second planetary gears respectively. They are corotatably connected by a connection ring. A rotating shaft is perpendicularly connected to the output shaft through bevel gears. A casing supporting the output and rotating shafts and is joined to the turning body.

10 Claims, 14 Drawing Sheets

POWER TRANSMISSION DEVICE

CROSS REFERENCE TO PRIOR APPLICATION

This application is a continuation of International Patent Application Serial No. PCT/JP2004/007192, filed May 26, 2004 which claims priority to Japanese Patent Application No. 2003-150328, filed May 28, 2003 which is incorporated by reference herein.

TECHNICAL FIELD

The present invention relates to a general-purpose power transmission device for transmitting a power on a turning body.

BACKGROUND OF THE INVENTION

Japanese Patent No. 3,012,417 describes a power transmission device for a 2WD (two-wheel drive) motorcycle. This power transmission device is provided with two housings. One housing is fixed on a body frame whereas the other housing is assembled with a front-wheel fork. These two housings are jointed so all-around rotatably that the front wheel can be turned 360 degrees by manipulating a handle.

The housing on the body side is provided with an input shaft whereas the housing on the front wheel side is provided with an output shaft. Between the input shaft and the output shaft, there are arranged two reversely rotating transmission lines and a differential gear mechanism. This differential gear mechanism is enabled to absorb such a rotating speed difference between the two lines as is caused as the front wheel side housing turns, thereby to prevent the mutual interference between the drive force for rotation by the engine and the drive force for turning by the handle.

SUMMARY OF THE INVENTION

According to the power transmission device of the prior art, however, numerous gears and bearings are needed for each of the two transmission lines and the differential gear mechanism. This need increases the number of parts for the entire device thereby to cause a drawback that the structure is complicated to increase the weight.

An object of the invention is to solve the problems and to provide a power transmission device, which can prevent the mutual interference between a drive force for rotation and a drive force for turning by a simple and light structure.

In order to solve the aforementioned problems, the power transmission device of the invention has the following structure. A turning body (5) and a transmission shaft (3) are supported at a housing (2) of a power transmission device (1) so as to be relatively coaxially rotatable. One (e.g., an input shaft (13) for rotation in FIG. 1, FIG. 9 and so on, or an output shaft (25) in FIG. 10) of an input shaft and an output shaft is connected to the transmission shaft (3). A first sun gear (19) is fixed on the transmission shaft (3), and first planetary gears (20) meshing with the first sun gear (19) are supported at a rotating body (8). A second sun gear (27) is fixed on the housing (2), and second planetary gears (28) meshing with the second sun gear (27) are supported at the turning body (5). A first inner gear (33) meshing with the first planetary gears (20) and a second inner gear (34) meshing with the second planetary gears (28) are corotatably connected to each other. The other shaft (e.g., the output shaft 25 in FIG. 1, FIG. 9 and so on, or the input shaft 13 for rotation in FIG. 10) of the input shaft and the output shaft is connected to the rotating body (8), and a rotating shaft (e.g., a screw shaft 47 in FIG. 1 and so on, a front wheel drive shaft 53 in FIG. 9 and so on, or a propeller shaft 64 in FIG. 10) is generally perpendicularly connected through a change-direction transmission member to the other shaft (25 or 13). The rotating shaft (47, 53 or 64) and the other shaft (25 or 13) are supported at an integral turning member, which turns integrally with the turning body (5).

Here, the aforementioned one shaft (13 or 25) may be supported at the housing (2) or not at the housing (2) but at another member outside of the housing (2). Moreover, the direction of the aforementioned one shaft (13 or 25) may be either generally perpendicular or generally parallel to (including coaxially of) the relative rotation axis of the transmission shaft (3) and the turning body (5). Specifically, how to support the aforementioned one shaft (13 or 25) includes the modes a, b and c, as exemplified in the following:

a: the mode, in which the aforementioned one shaft (i.e., the input shaft 13 for rotation in FIG. 1) is supported at the housing (2) generally perpendicularly to the relative rotation axis of the transmission shaft (3) and the turning body (5);

b: the mode, in which the aforementioned one shaft (i.e., the input shaft 13 for rotation in FIG. 12) is supported at the housing (2) coaxially of the relative rotation axis of the transmission shaft (3) and the turning body (5); and c: the mode, in which the transmission shaft (3) protrudes to the outside of the housing (2) so that the aforementioned one shaft (e.g., the input shaft 13 for rotation in FIG. 9 and so on, or the output shaft 25 in FIG. 10) supported at another member outside of the housing (2) is connected to that protrusion.

Moreover, the positional relation between the housing (2) and the turning body (5) is not especially limited. For example, the turning body (5) may also be supported on the inner side of the housing (2), as shown in FIG. 1 and so on. As shown in FIG. 13, still moreover, the turning body (5) may also be supported coaxially (or arranged in the axial direction) with the housing (2).

In order to reduce the entire size of the device, moreover, it is preferred that the transmission shaft (3) is inserted into the inner side of the turning body (5), and the first sun gear (19), the first planetary gears (20), the rotating body (8), the second sun gear (27), the second planetary gears (28), the first inner gear (33) and the second inner gear (34) are arranged on the inner side of the turning body (5).

More preferably, a hollow-cylindrical shaft (4) is fixed on the housing (2) and is inserted on the outer side of the transmission shaft (3) and on the inner side of the turning body (5), and the second sun gear (27) is fixed on the hollow-cylindrical shaft (4). In this case, it is preferred that the first sun gear (19) and the first planetary gears (20) are juxtaposed to each other in the axial direction of the turning body (5) so that the first planetary gears (20) and the second planetary gears (28) are juxtaposed to each other in the axial direction of the turning body (5), and that the first inner gear (33) and the second inner gear (34) are juxtaposed to each other in the axial direction of the turning body (5).

The integral turning member can be exemplified by a casing (44) covering the rotating shaft (47, 53 or 64) and the aforementioned other shaft (25 or 13), although not especially limited thereto. The change-direction transmission member can be exemplified by a pair of bevel gears (45 and 46), a flexible joint and so on, although not especially limited thereto.

In the power transmission device (1) of the invention, the first sun gear (19), the first planetary gears (20) and the first inner gear (33) constitute one set of planetary gear mechanisms. Moreover, the second sun gear (27), the second planetary gears (28) and the second inner gear (34) constitute another set of planetary gear mechanism. The planetary gear mechanism has a smaller number of gears than that of the differential gear mechanism of the prior art so that it can make the power transmission device (1) simple and light. Moreover, the two sets of planetary gear mechanisms are interposed between the transmission shaft (3) and the turning body (5), and control both the drive force for rotation to act on the transmission shaft (3) and the drive force for turning to act on the turning body (5) so that the two drive forces may not mutually interfere. During the rotation of the transmission shaft (3), moreover, the two sets of planetary gear mechanisms apply a turning force in one direction from the transmission shaft (3) to the turning body (5) and a turning force in the opposite direction from the integral turning member such as the casing (44) to the turning body (5). These turning forces offset each other to keep the turning body (5) in a balanced still state thereby to prevent the integral turning member such as the casing (44) from turning together.

Here, the applications of the power transmission device should not be especially limited but can be exemplified by steering wheel drive mechanisms in various vehicles such as motorcycles, bicycles four-wheel automobiles, fork-lifts, vehicles for high lift work, tricycle buggies, tricycle tractors or snowmobiles of front-wheel drive type, rear-wheel drive type or four-wheel drive type. Moreover, the power transmission device can also be incorporated into the propelling mechanism of a ship (including not only a practical ship but also a pleasure-boat on a pond, a lake or a playground), the propelling mechanism of an airplane such as a VTOL, the spindle drive mechanism of a machine tool, the hand mechanism of a robot, the oscillating mechanism of an electric fan or a power generating system using wind, tide, wave or water power, an agitator (or mixer), or other various mechanisms.

According to the power transmission device of the invention, as has been detained hereinbefore, the two sets of planetary gear mechanisms are interposed between the transmission shaft and the turning body. Thus, there is attained an excellent advantage that the mutual interference between the drive force for rotation and the drive force for turning can be prevented by the simple and light structure.

DETAILED DESCRIPTION OF THE INVENTION

Figure 1:
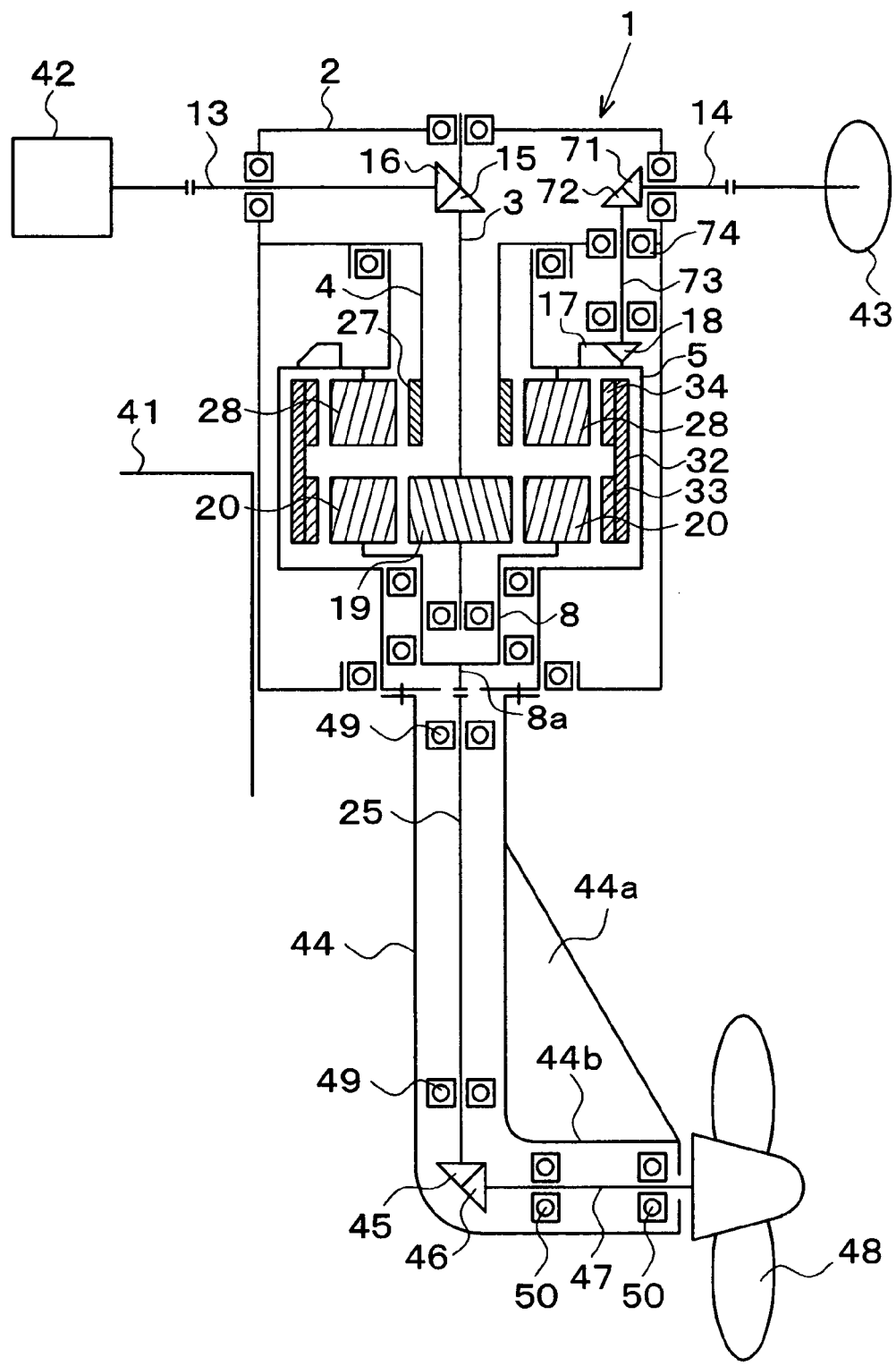
FIG. 1 is a schematic diagram, in which the power transmission device of Embodiment 1 according to the invention is applied to the ship propelling mechanism.

A turning body (5) and a transmission shaft (3) are supported at a housing (2) of a power transmission device (1) so as to be relatively coaxially rotatable. One shaft (13) of an input shaft and an output shaft is connected to the transmission shaft (3). A first sun gear (19) is fixed on the transmission shaft (3), and first planetary gears (20) meshing with the first sun gear (19) are supported at a rotating body (8). A second sun gear (27) is fixed on the housing (2), and second planetary gears (28) meshing with the second sun gear (27) are supported at the turning body (5). A first inner gear (33) meshing with the first planetary gears (20) and a second inner gear (34) meshing with the second planetary gears (28) are corotatably connected to each other. The other shaft (25) of the input shaft and the output shaft is connected to the rotating body (8), and a rotating shaft (47) is generally perpendicularly connected to the other shaft (25) through a change-direction transmission member. The rotating shaft (47) and the other shaft (25) are supported at an integral turning member which turns integrally with the turning body (5). The transmission shaft (3) is inserted into the inner side of the turning body (5), and the first sun gear (19), the first planetary gears (20), the rotating body (8), the second sun gear (27), the second planetary gears (28), the first inner gear (33) and the second inner gear (34) are arranged on the inner side of the turning body (5). The hollow-cylindrical shaft (4) is fixed on the housing (2) and is inserted on the outer side of the transmission shaft (3) and on the inner side of the turning body (5), and the second sun gear (27) is fixed on the hollow-cylindrical shaft (4). The first sun gear (19) and the first planetary gears (20) are juxtaposed to each other in the axial direction of the turning body (5) so that the first planetary gears (20) and the second planetary gears (28) are juxtaposed to each other in the axial direction of the turning body (5), and the first inner gear (33) and the second inner gear (34) are juxtaposed to each other in the axial direction of the turning body (5).

EMBODIMENT 1

Embodiments of the invention are described in the following with reference to the accompanying drawings. In a power transmission device 1 of Embodiment 1, as shown in FIG. 1 to FIG. 4, a transmission shaft 3 is disposed at the center of a housing 2, and a turning body 5 is arranged on the outer side of the transmission shaft 3 through a hollow-cylindrical shaft 4. The turning body 5 is supported at the housing 2 by bearings 6 and 7, and a cup-shaped rotating body 8 is supported on the inner side of the lower end portion of the turning body 5 by a bearing 9. The transmission shaft 3 is almost inserted into the inner side of the turning body 5, and has its lower end supported at the rotating body 8 by a bearing 11 and its upper end supported at the housing 2 by a bearing 10. As a result, the transmission shaft 3 and the turning body 5 are supported at the housing 2 so as to be relatively coaxially rotatable. The hollow-cylindrical shaft 4 is inserted into the inner side of the turning body 5 on the outer side of the transmission shaft 3 and has its upper end fixed on the housing 2.

An input shaft 13 for rotation and an input shaft 14 for turning are supported at the housing 2 generally perpendicularly to the relative rotation axis of the transmission shaft 3 and the turning body 5. The transmission shaft 3 is connected to the rotating input shaft 13 through bevel gears 15 and 16. The turning body 5 is connected to the turning input shaft 14 through bevel gears 17 and 18. A first sun gear 19 is fixed on the transmission shaft 3, and a plurality of (e.g., four in FIG. 3) first planetary gears 20 mesh with the first sun gear 19. The first planetary gears 20 are supported between two supporting plates 21 and 22 by shafts 23, and the lower supporting plate 22 is fixed on the rotating body 8. An output portion 8a protrudes on the same axis as that of the transmission shaft 3 from the lower face of the rotating body 8, and an output shaft 25 is connected to the output portion 8a.

A second sun gear 27 is fixed on the outer circumference of the lower end portion of the hollow-cylindrical shaft 4, and a plurality of (e.g., four in FIG. 4) second planetary gears 28 mesh with the second sun gear 27. The second planetary gears 28 are supported by shafts 31 between two supporting plates 29 and 30, and the upper supporting plate 29 is fixed on the turning body 5. The turning body 5 is provided with a larger-diameter portion 5a midway in the axial direction. On the inner side of the larger-diameter portion 5a, the first planetary gears 20 and the second planetary gears 28 are juxtaposed in the axial direction of the turning body 5, and a connecting ring 32 is rotatably housed to enclose those planetary gears 20 and 28. On the inner circumference of the connecting ring 32, there are fixed a first inner gear 33 meshing with the first planetary gears 20 and a second inner gear 34 meshing with the second planetary gears 28. Moreover, those two inner gears 33 and 34 are integrally rotatably connected by the connecting ring 32.

FIG. 1 is a schematic diagram of a ship propelling mechanism and shows one application example of the power transmission device 1. Here: the housing 2 is fixed on a hull 41; the rotating input shaft 13 is connected to an engine 42; and the turning input shaft 14 is connected to a handle 43. The turning body 5 is provided with an integrally turnable casing 44 having a rudder 44a, and the turning body 5 and the casing 44 are assembled with the housing 2 so as to turn all around relative to the housing 2. The output shaft 25 is supported at the casing 44 by a bearing 49, and a screw shaft 47 is perpendicularly connected as the rotating shaft to the output shaft 25 through bevel gears 45 and 46. The screw shaft 47 is supported at a bent portion 44b of the casing 44 by a bearing 50, and a screw 48 is attached to the outer end of the screw shaft 47.

Moreover, the drive force for rotation by the engine 42 is transmitted to the screw 48 through the rotating input shaft 13, the bevel gears 16 and 15, the transmission shaft 3, the first sun gear 19, the first planetary gears 20, the rotating body 8, the output shaft 25, the bevel gears 45 and 46 and the screw shaft 47. On the other hand, the drive force for turning by the handle 43 is transmitted to the casing 44 through the turning input shaft 14, bevel gears 71 and 72, a transmission shaft 73, the bevel gears 18 and 17 and the turning body 5. The transmission shaft 73 is supported at the housing 2 perpendicularly to the turning input shaft 14 by a bearing 74.

Next, the actions of the power transmission device 1 thus constituted are described with reference to FIG. 5A to FIG. 8B. FIGS. 5A, 6A, 7A and 8A correspond to FIG. 3 and show the members connected to the first sun gear 19, and FIGS. 5B, 6B, 7B and 8B correspond to FIG. 4 and show the members connected to the second sun gear 27. In FIGS. 5A to 8B, arrows indicate the rotating directions of those members, but there are no arrows in the stationary members. In FIGS. 5B, 6B, 7B and 8B, the supporting plate 29 is shown in a shape different from that of FIG. 4 so as to make understandable the integral actions of the turning body 5 and the second planetary gears 28.

Figure 5A:
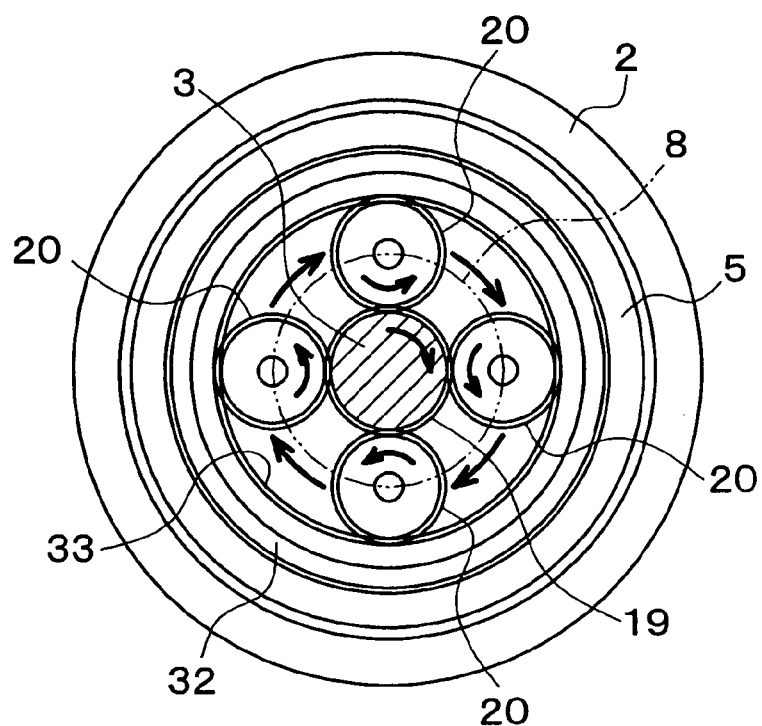
FIG. 5A is an action explaining diagram of a portion, as shown in FIG. 3, of the power transmission device in a state with a transmission shaft rotating and a turning body standing still.
Figure 5B:
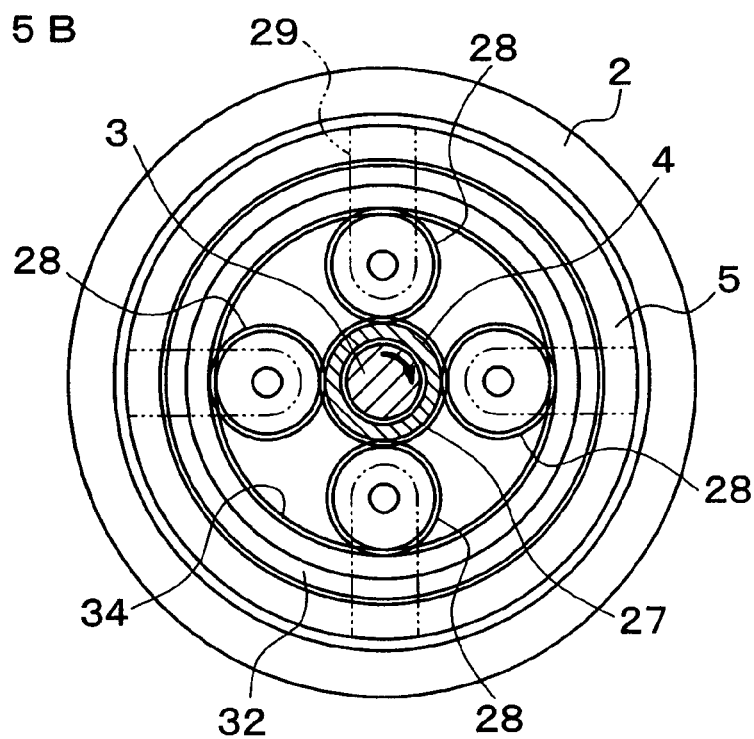
FIG. 5B is an action explaining diagram of a portion, as shown in FIG. 4, of the power transmission device in the same state as that of FIG. 5A.

FIG. 5A and FIG. 5B show the state, in which the transmission shaft 3 is rotating whereas the turning body 5 stands still, that is, the state of the ship propelling mechanism, in which the screw 48 is rotating whereas the casing 44 stands still in a predetermined direction. When the transmission shaft 3 rotates (e.g., in the clockwise direction), the first sun gear 19 rotates, and the first planetary gears 20 revolve around the first sun gear 19 in the clockwise direction while auto-rotating on its own axis in the counter-clockwise direction, as shown in FIG. 5A. Then, the revolutions of the first planetary gears 20 are extracted to the rotating body 8 by the first inner gear 33, and the screw 48 is rotated through the output shaft 25, the bevel gears 45 and 46 and the screw shaft 47, as shown in FIG. 1, in accordance with the rotation of the rotating body 8. At this time, the planetary gear mechanism of the first sun gear 19, the first planetary gears 20 and the first inner gear 33 act as a decelerator so that the rotating body 8 decelerates with respect to the transmission shaft 3. Thus, this power transmission device 1 also acts as the decelerator so that it can advantageously dispense with the decelerator.

At this time, moreover, a clockwise (as FIG. 1 is viewed downward) turning force around the output shaft 25 as the center is exerted on the screw shaft 47 by the meshing engagement between the bevel gears 45 and 46. By this turning force, the turning body 5 is urged to turn clockwise through the casing 44. By the counter-clockwise auto-rotations of the first planetary gears 20, on the other hand, a counter-clockwise rotating force is exerted on the first inner gear 33. By this rotating force, as shown in FIG. 5B, the turning body 5 is urged to turn counter-clockwise through the connecting ring 32, the second inner gear 34 and the second planetary gears 28. At the rotating time of the transmission shaft 3, therefore, the turning force to act on the turning body 5 can be offset to balance and hold the turning body 5 in the still state thereby to prevent the casing 44 from turning together.

Figure 6A:
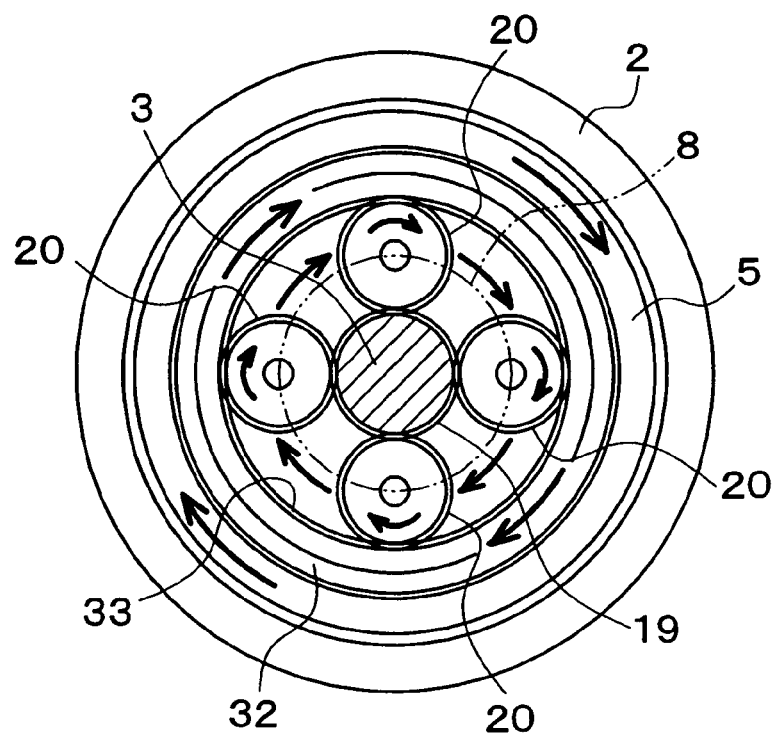
FIG. 6A is an action explaining diagram of a portion, as shown in FIG. 3, of the power transmission device in a state with the transmission shaft standing still and the turning body turning.
Figure 6B:
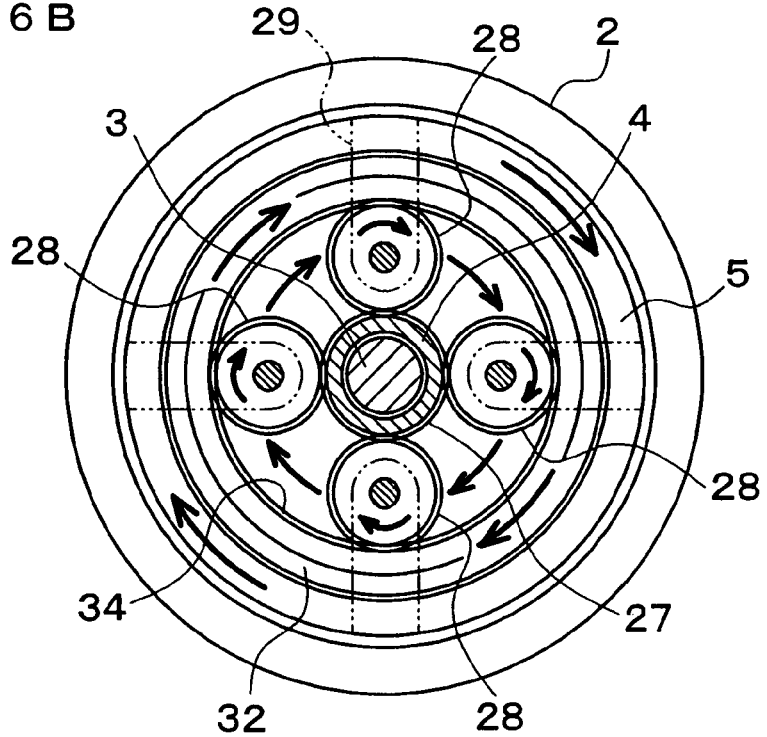
FIG. 6B is an action explaining diagram of a portion, as shown in FIG. 4, of the power transmission device in the same state as that of FIG. 6A.

FIG. 6A and FIG. 6B show the state, in which the transmission shaft 3 stands still whereas the turning body 5 is turning, that is, the state, in which the screw 48 stands still whereas the casing 44 is turning. As the turning body 5 turns (e.g., in the clockwise direction), the second planetary gears 28 revolve around the second sun gear 27 while auto-rotating on its own axis, as shown in FIG. 6B. At this time, the second sun gear 27 does not rotate, and the revolutions of the second planetary gears 28 are transmitted to the second inner gear 34 so that the connecting ring 32 rotates in the same direction as that of the turning body 5. As shown in FIG. 6A, moreover, the first inner gear 33 rotates integrally with the connecting ring 32, and the first planetary gears 20 revolve around the first sun gear 19 while auto-rotating on its own axis. In accordance with the revolutions of the first planetary gears 20, moreover, the rotating body 8 and the output shaft 25 rotate.

At this time, the first planetary gears 20 auto-rotate and revolve around the first sun gear 19 so that the transmission shaft 3 is held in the still state. Moreover, the rotating body 8 is rotated at the same angle and in the same direction as those of the turning body 5 through the gear trains 28-34-33-20 by the turning body 5 so that no relative rotation occurs between the output shaft 25 and the casing 44. In FIG. 1, more specifically, even when the bevel gear 45 rotates, the bevel gear 46 turns at the same angle around the bevel gear 45. Therefore, no power transmission occurs between the output shaft 25 and the screw shaft 47 so that the screw 48 is held in the stationary state with respect to the casing 44. This eliminates a fear that the engine 42 and the screw 48 are rotated by the drive force for turning, so that the handle 43 can be easily operated by a light force.

Figure 7A:
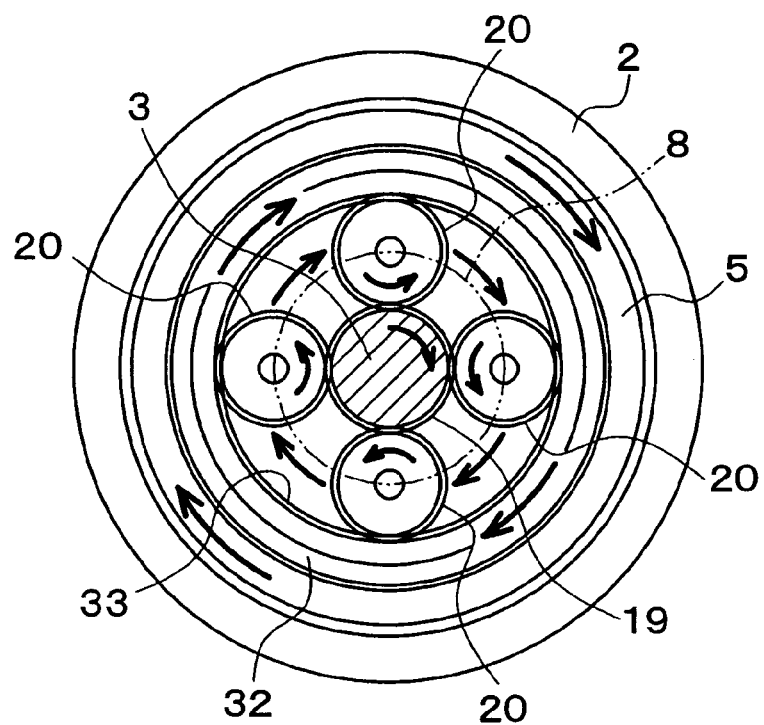
FIG. 7A is an action explaining diagram of a portion, as shown in FIG. 3, of the power transmission device in a state with the transmission shaft rotating clockwise and the turning body turning clockwise.
Figure 7B:
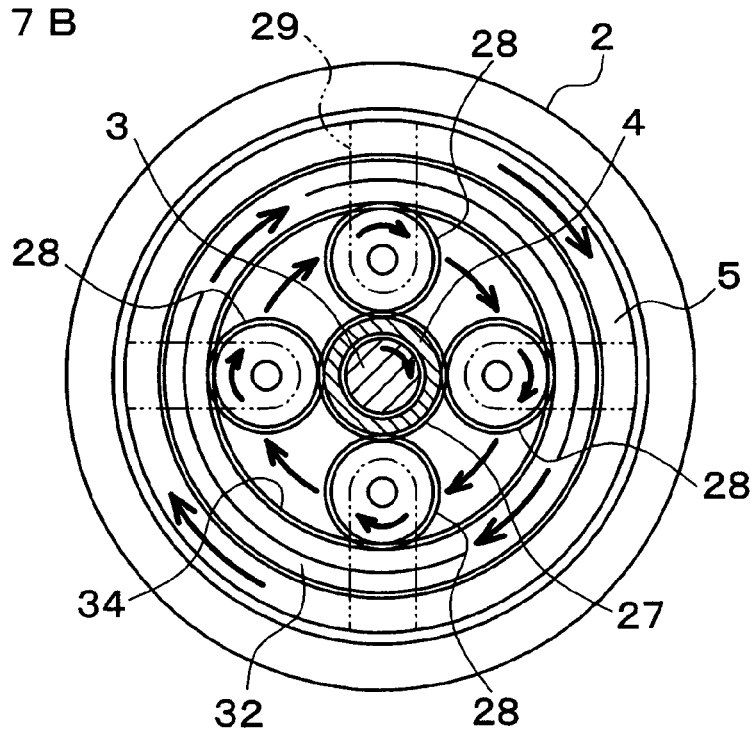
FIG. 7B is an action explaining diagram of a portion, as shown in FIG. 4, of the power transmission device in the same state as that of FIG. 7A.

FIG. 7A and FIG. 7B show the state, in which the transmission shaft 3 rotates clockwise and in which the turning body 5 turns clockwise, that is, the state, in which the screw 48 and the casing 44 are simultaneously driven. When the transmission shaft 3 rotates clockwise, the first sun gear 19 rotates clockwise whereas the first planetary gears 20 revolve around the first sun gear 19 in the clockwise direction while auto-rotating on its own axis in the counter-clockwise direction, as shown in FIG. 7A. In accordance with the revolutions of the first planetary gears 20, moreover, the rotating body 8, the output shaft 25, the screw shaft 47 and the screw 48 individually rotate. At this time, the turning forces in the opposite directions are balanced in the turning body 5, as described hereinbefore, so that the turning body 5 is not turned by the rotating drive force of the transmission shaft 3. When the turning body 5 is turned in the clockwise direction, on the other hand, the second planetary gears 28 revolve around the second sun gear 27 in the clockwise direction while auto-rotating on its own axis in the clockwise direction, as shown in FIG. 7B. In accordance with the revolutions of the second planetary gears 28, moreover, the second inner gear 34 and the connecting ring 32 rotate clockwise.

At this time, as shown in FIG. 7A, the clockwise revolving angle of the first planetary gears 20 is so seen from the side of the housing 2 as to be increased by the clockwise rotation of the first inner gear 33. However, the turning body 5 turns in the same direction as the revolving direction of the first planetary gears 20. Therefore, the revolving angle of the first planetary gears 20 with respect to the turning body 5 is not influenced by the drive force for turning but determined exclusively by the drive force for rotation. As a result, the rotating speed of the screw 48 is not changed by the drive force for turning, and the turning body 5 is not turned by the drive force for rotation. Therefore, the mutual interference between the drive force for rotation and the drive force for turning can be reliably prevented to operate the handle 43 lightly and safely and to transmit the power of the engine 42 efficiently to the screw 48.

Figure 8A:
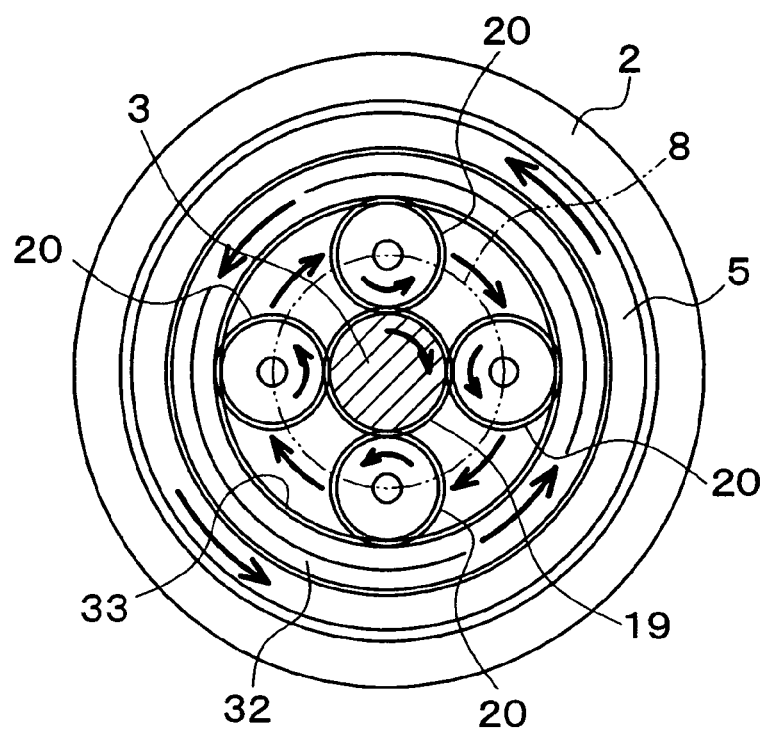
FIG. 8A is an action explaining diagram of a portion, as shown in FIG. 3, of the power transmission device in a state with the transmission shaft rotating clockwise and the turning body turning counter-clockwise.
Figure 8B:
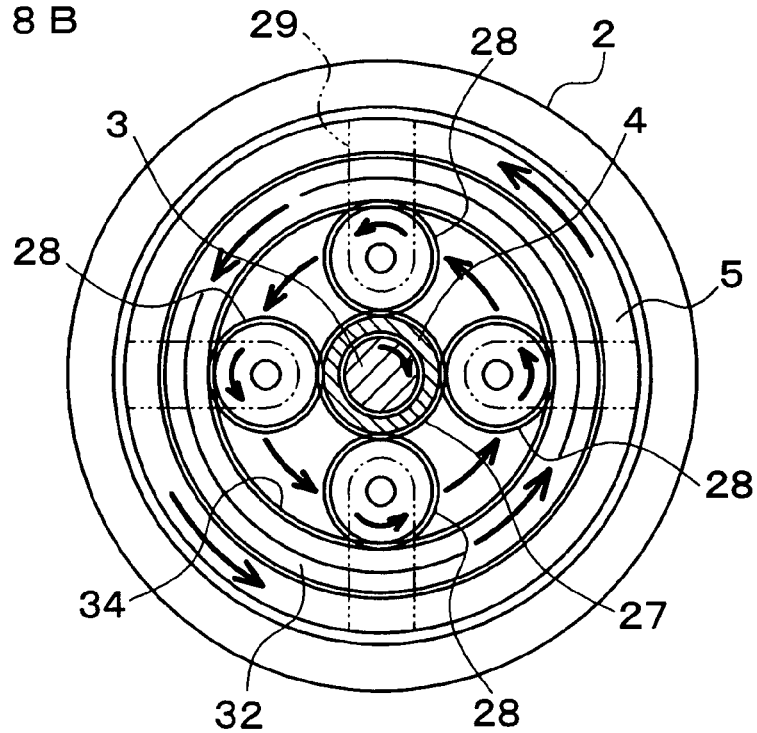
FIG. 8B is an action explaining diagram of a portion, as shown in FIG. 4, of the power transmission device in the same state as that of FIG. 8A.

FIG. 8A and FIG. 8B show the state, in which the transmission shaft 3 rotates clockwise whereas the turning body 5 is turning counter-clockwise oppositely of FIG. 7A and FIG. 7B. In accordance with the clockwise rotation of the first sun gear 19, as shown in FIG. 8A, the first planetary gears 20 revolve around the first sun gear 19 in the clockwise direction while auto-rotating on its own axis in the counter-clockwise direction. In accordance with the revolutions of the first planetary gears 20, moreover, the rotating body 8, the output shaft 25, the screw shaft 47 and the screw 48 individually rotate. At this time, too, the turning forces in the opposite directions are balanced in the turning body 5 so that the turning body 5 is not turned by the rotating drive force of the transmission shaft 3.

When the turning body 5 is turned counter-clockwise, on the other hand, the second planetary gears 28 revolve around the second sun gear 27 in the counter-clockwise direction while auto-rotating on its own axis in the counter-clockwise direction, as shown in FIG. 8B. In accordance with the revolutions of the second planetary gears 28, moreover, the second inner gear 34 and the connecting ring 32 rotate counter-clockwise. In this case, too, as shown in FIG. 8A, the clockwise revolving angle of the first planetary gears 20 is so seen from the side of the housing 2 as to be decreased by the counter-clockwise rotation of the first inner gear 33. However, the turning body 5 turns in the opposite direction of the revolving direction of the first planetary gears 20. Therefore, the revolving angle of the first planetary gears 20 with respect to the turning body 5 is not influenced by the drive force for turning. As at the clockwise turning time, therefore, the drive force for rotation and the drive force for turning can be so properly controlled as to prevent their mutual interference.

EMBODIMENT 2

Figure 9:
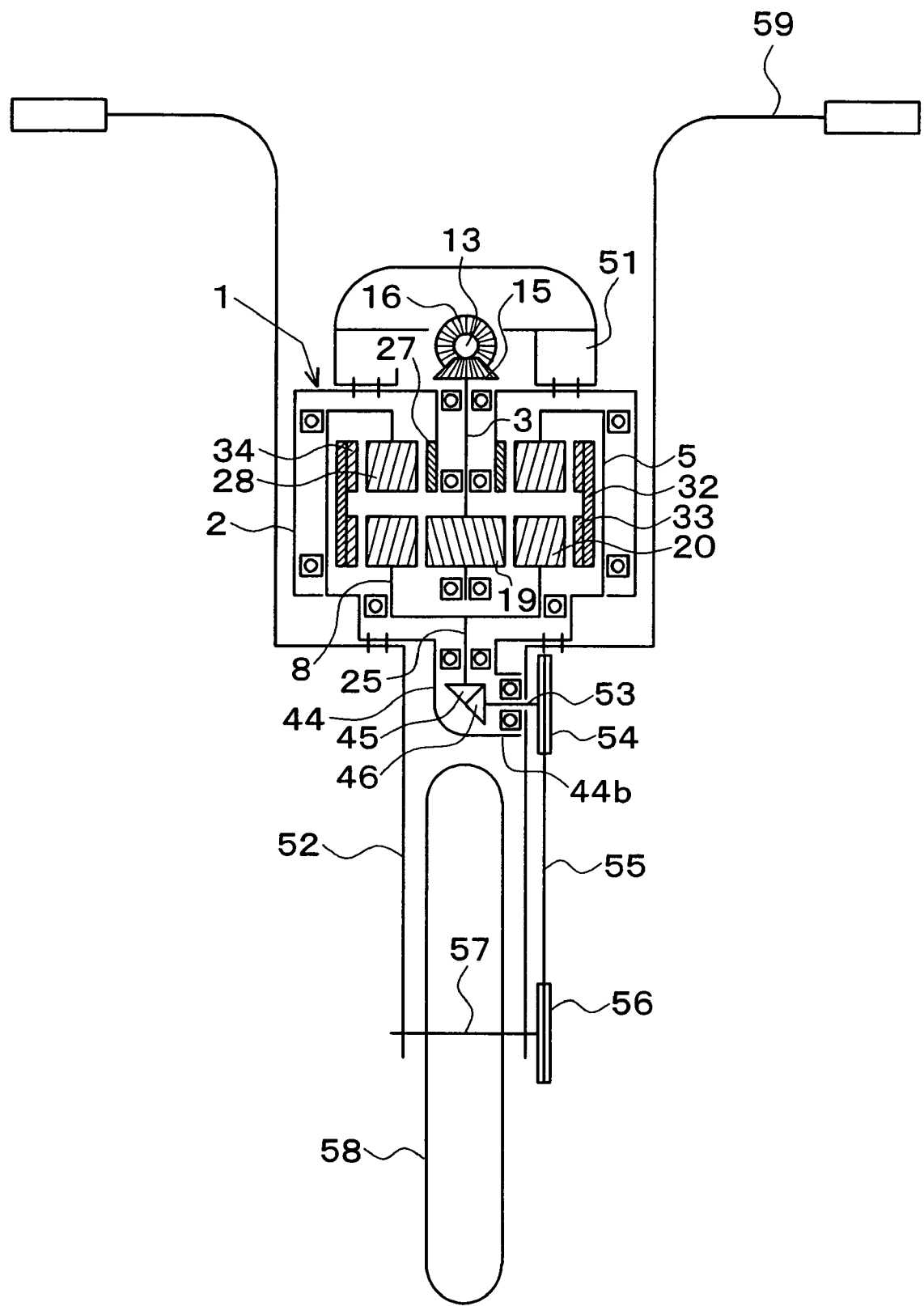
FIG. 9 is a schematic diagram of a 2WD vehicle showing an application example of the power transmission device of Embodiment 2.

Here is described another application example of the power transmission device 1. In this application example shown in FIG. 9, the power transmission device 1 is incorporated into a 2WD motorcycle or bicycle. Accordingly, the power transmission device 1 of Embodiment 2 shown in FIG. 9 is different in the supporting structure of the rotating input shaft 13 and in the input type for turning from the power transmission device 1 of Embodiment 1. Specifically, the transmission shaft 3 protrudes to the outside of the housing 2, and the rotating input shaft 13 is connected to that protruding portion through the bevel gears 15 and 16. The rotating input shaft 13 may or may not be supported by the housing 2. This housing 2 is fixed on a body frame 51; the turning body 5 is mounted on a front wheel fork 52; and the output shaft 25 and a front wheel drive shaft 53 acting as the rotating shaft are supported at the casing 44. The drive force for rotation by the engine or the pedal (although not shown) is transmitted to a front wheel 58 through the rotating input shaft 13, the bevel gears 16 and 15, the transmission shaft 3, the first sun gear 19, the first planetary gears 20, the rotating body 8, the output shaft 25, the bevel gears 45 and 46, the front wheel drive shaft 53, a drive sprocket 54, a chain 55, a driven sprocket 56 and an axle 57. On the other hand, a handle 59 is connected to the turning body 5 so that the drive force for turning by the handle 59 is transmitted to the front wheel fork 52 through the turning body 5. Therefore, the turning input shaft 14 is omitted, although it is supported at the housing 2 in Embodiment 1.

In this 2WD motorcycle or bicycle, too, the power transmission device 1 acts as in the case of the ship propelling mechanism. Thus, there is neither a fear that the drive force for rotation by the engine or pedal is transmitted to the turning body 5 and the front wheel fork 52 nor a fear that the drive force for turning by the handle 59 is transmitted to the transmission shaft 3 and the output shaft 25. As a result, there arises an advantage that the mutual interference between the drive force for rotation and the drive force for turning can be prevented to operate the handle 59 especially lightly and safely.

EMBODIMENT 3

Figure 10:
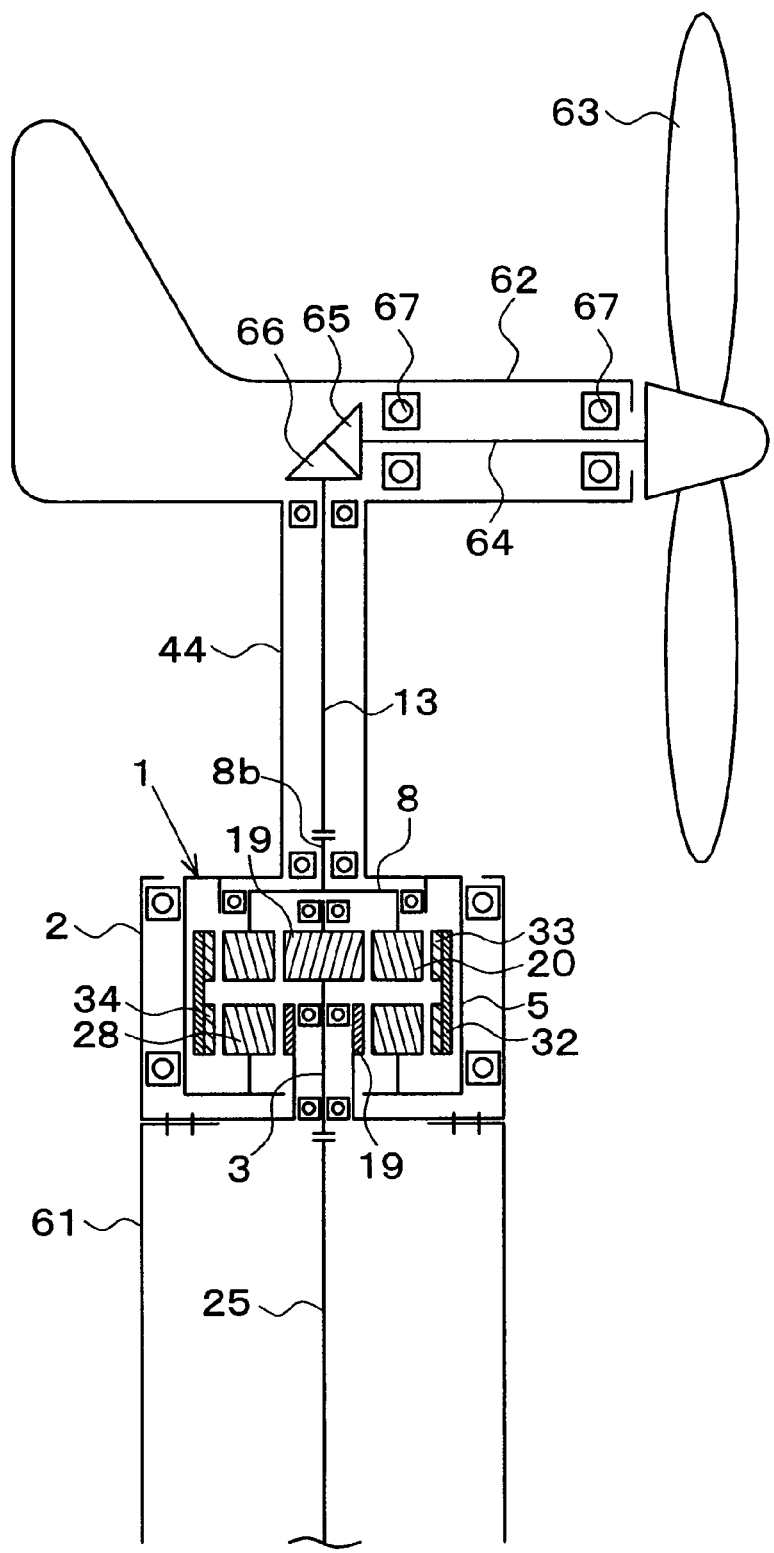
FIG. 10 is a schematic diagram of an oscillating mechanism of a wind power generating system showing an application example of the power transmission device of Embodiment 3.

In an application example shown in FIG. 10, the power transmission device 1 is incorporated into the oscillating mechanism of a wind power generating system. Accordingly, the power transmission device 1 of Embodiment 3 shown in FIG. 10 is different in the following points from the power transmission device 1 of Embodiment 1. Specifically: the housing 2 is fixed on a post 61 in a mode inverted from that of the case of the ship propelling mechanism; the rotating input shaft 13 is connected to an input portion 8b of the rotating body 8; and the output shaft 25 is connected to the lower end of the transmission shaft 3. An oscillating head 62 is so mounted on the turning body 5 through the casing 44 as to turn in all directions; the rotating input shaft 13 is supported at the casing 44; and a propeller shaft 64 is supported at the oscillating head 62 by a bearing 67. The propeller shaft 64 is perpendicularly connected to the rotating input shaft 13 through bevel gears 65 and 66, and a propeller 63 is attached to the outer end of the propeller shaft 64. The drive force for rotation by the propeller 63 is transmitted to the generator (not-shown) through the propeller shaft 64, the bevel gears 65 and 66, the rotating input shaft 13, the rotating body 8, the first planetary gears 20, the first sun gear 19, the transmission shaft 3 and the output shaft 25. The drive force for turning by the wind is transmitted to the turning body 5 through the oscillating head 62 and the casing 44.

In this oscillating mechanism, the input/output of the drive force for rotation is reversed from that of the case of the ship propelling mechanism, but the fundamental actions of the power transmission device 1 are identical. This eliminates a fear that the drive force for rotation by the propeller 63 is transmitted to the turning body 5, the casing 44 and the oscillating head 62. Nor is a fear that the drive force for turning by the wind is transmitted to the transmission shaft 3 and the output shaft 25. As a result, the mutual interference between the drive force for rotation and the drive force for turning can be prevented to improve especially the adaptability of the oscillating head 62 to the wind direction and to transmit the power of the propeller 63 without any loss to the generator. Moreover, the oscillating head 62 turns in all directions, thereby to make it possible to constitute a system, which is excellent in the rotating performance of the propeller 63 and high in the power generating efficiency. In this application example, moreover, the planetary gear mechanism by the first sun gear 19, the first planetary gears 20 and the first inner gear 33 acts as an accelerating device so that the transmission shaft 3 has a higher velocity than the rotating body 8. In short, this power transmission device 1 acts as the accelerating device so that it has an advantage in dispensing with any additional accelerating device.

EMBODIMENT 4

Figure 11:
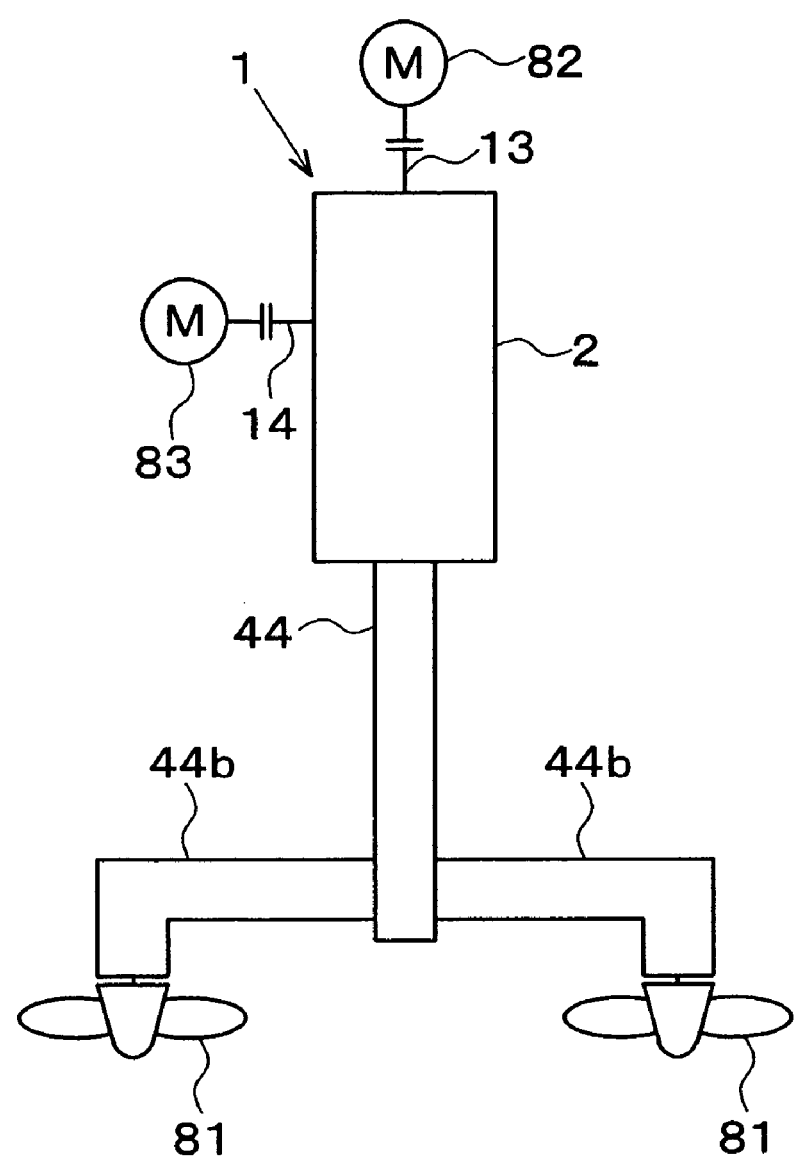
FIG. 11 is a schematic diagram of an agitator showing an application example of the power transmission device of Embodiment 4.

In an application example shown in FIG. 11, the power transmission device 1 of Embodiment 4 is incorporated into an agitator (or mixer) for fluid materials. The casing 44 is provided with a plurality of bent portions 44b, which are individually provided at their leading ends with downward agitating blades 81. Moreover, a motor 82 for rotating the agitating blades 81 is connected to the rotating input shaft 13, and a motor 83 for turning the casing 44 is connected to the turning input shaft 14.

According to this agitator, the power transmission device 1 prevents the mutual interference between the rotating drive force of the motor 82 and the turning drive force of the motor 83 so that the rotating speed of the agitating blades 81 and the turning speed of the casing 44 can be controlled separately and freely of each other. Therefore, the narrow zone of the fluid materials can be sufficiently agitated, for example, by rotating the agitating blades 81 at a high speed and by turning the casing 44 at a low speed. On the other hand, the wide zone of the fluid materials can also be agitated for a short time period by rotating the agitating blades 81 at a low speed and by turning the casing 44 at a high speed.

EMBODIMENT 5

Figure 12:
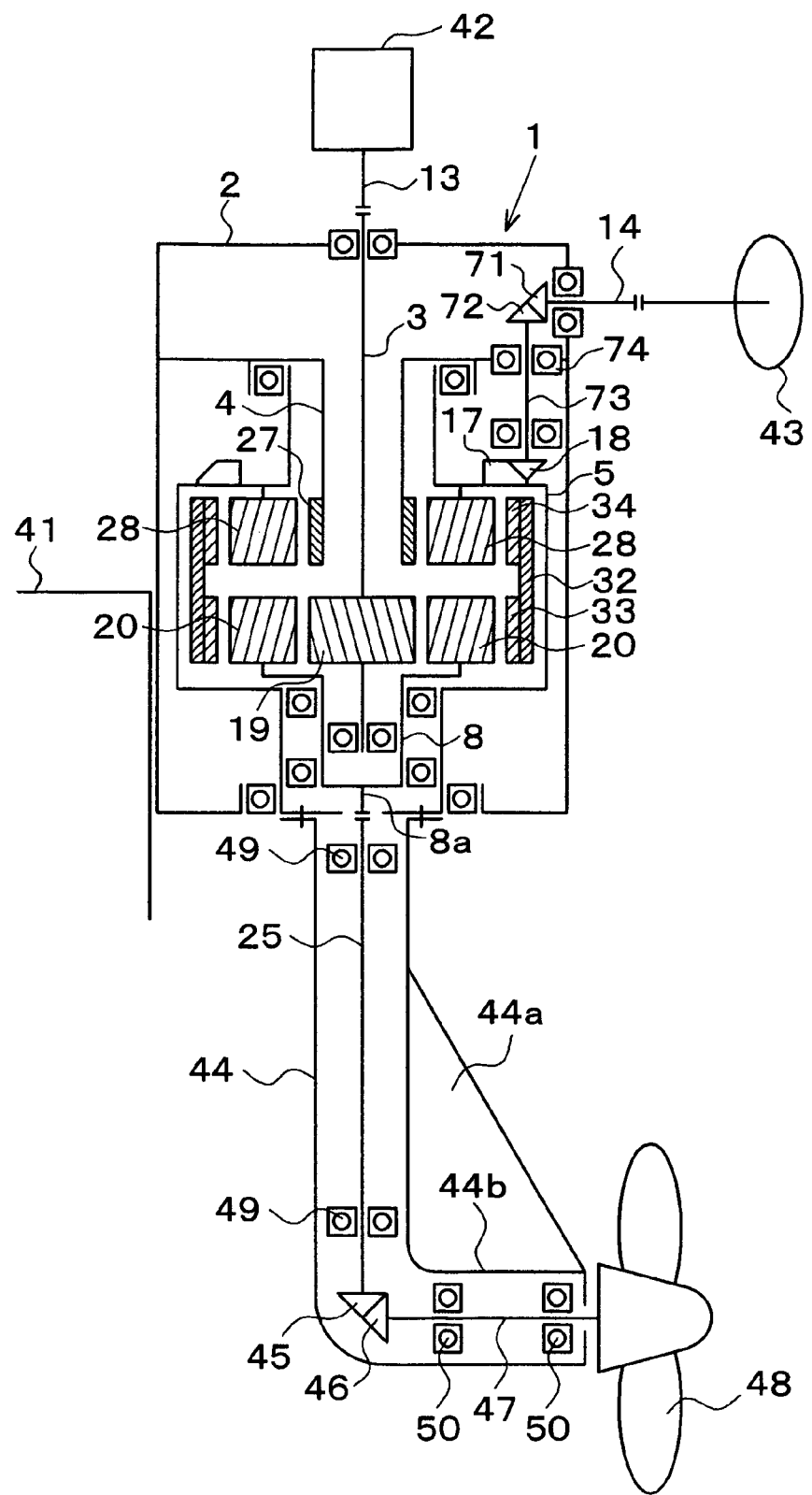
FIG. 12 is a schematic diagram of a ship propelling device showing an application example of the power transmission device of Embodiment 5.

In an application example shown in FIG. 12, the power transmission device 1 is incorporated as in Embodiment 1 into the ship propelling mechanism. The power transmission device 1 of Embodiment 5 shown in FIG. 12 is different from that of Embodiment 1 in that the rotating input shaft 13 is so connected that it is arranged coaxially with the transmission shaft 3. The actions and advantages are similar to those of Embodiment 1.

EMBODIMENT 6

Figure 13:
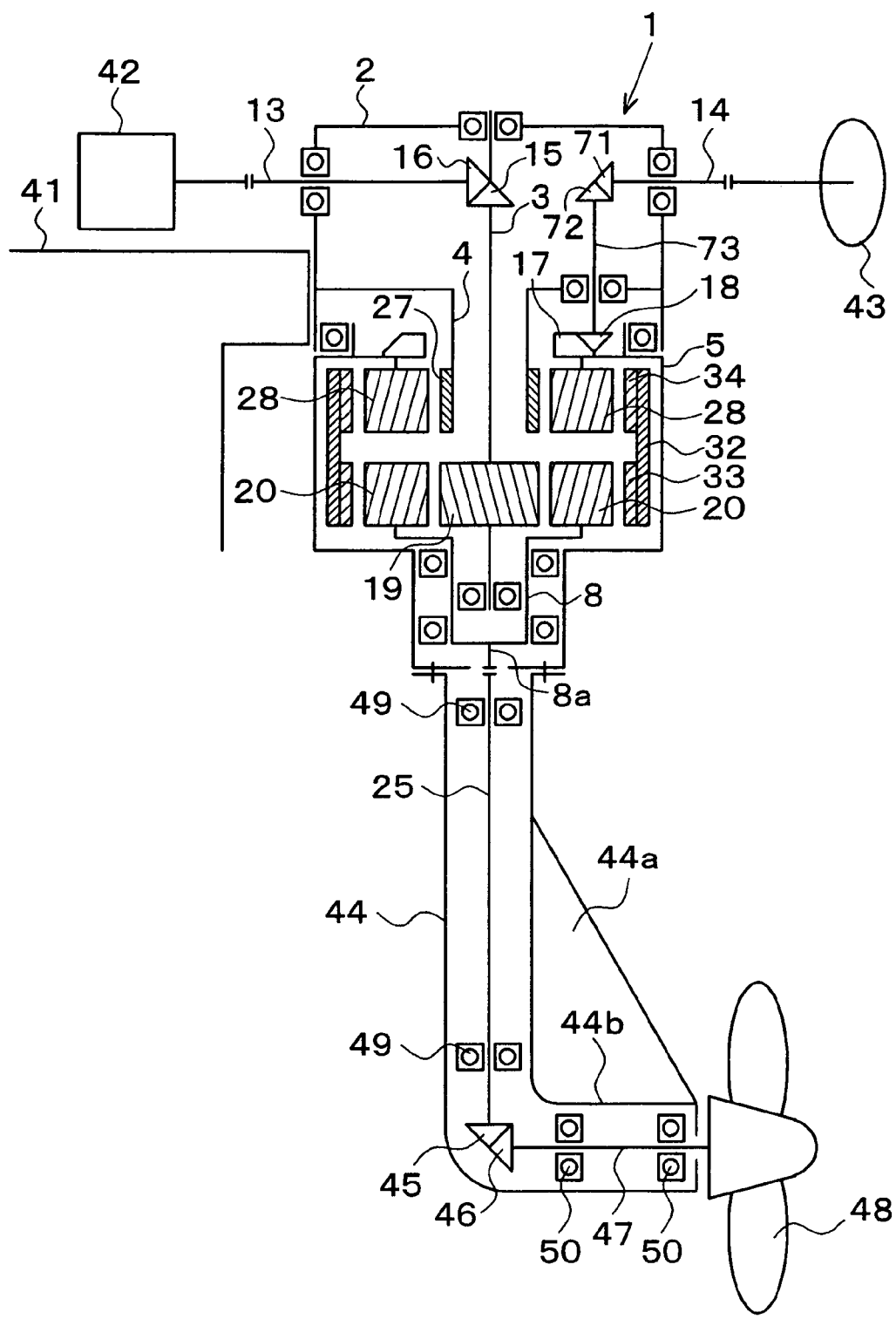
FIG. 13 is a schematic diagram of a ship propelling device showing an application example of the power transmission device of Embodiment 6.

In an application example shown in FIG. 13, the power transmission device 1 is incorporated as in Embodiment 1 into the ship propelling mechanism. The power transmission device 1 of Embodiment 6 shown in FIG. 13 is different from that of Embodiment 1 in that the turning body 5 is supported and juxtaposed coaxially of the housing 2. However, the actions and advantages are similar to those of Embodiment 1.

EMBODIMENT 7

Figure 14:
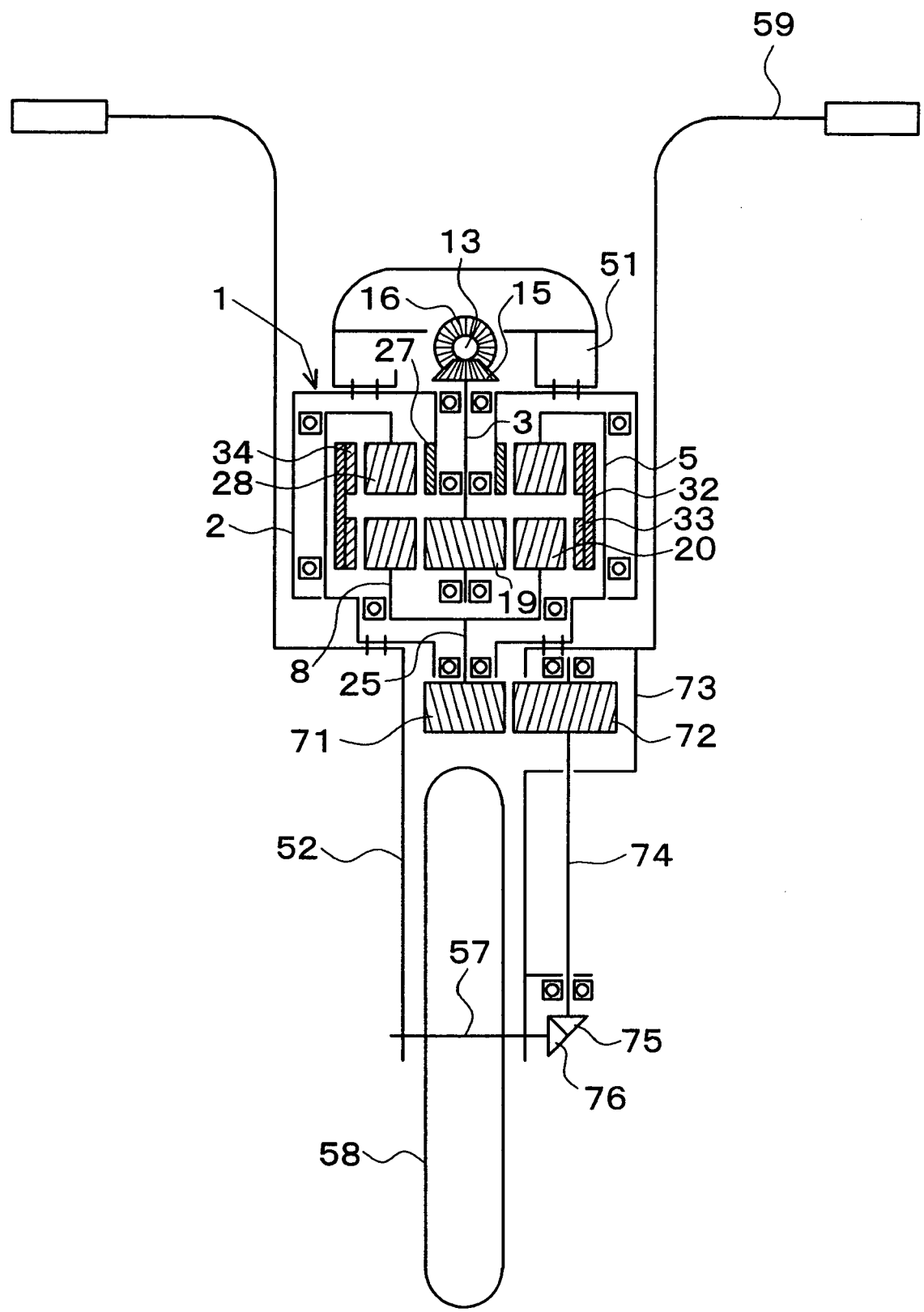
FIG. 14 is a schematic diagram of a 2WD vehicle showing an application example of the power transmission device of Embodiment 7.

In an application example shown in FIG. 14, the power transmission device 1 is incorporated as in Embodiment 2 into a 2WD motorcycle or bicycle. The power transmission device 1 of Embodiment 7 shown in FIG. 14 is different from that of Embodiment 2 in that a pinion gear 71 is attached to the output shaft 25, in that a pinion gear 72 meshing with the pinion gear 71 is supported at a cover 73 turning integrally with the turning body 5, and in that the axle 57 is connected through bevel gears 75 and 76 to a transmission shaft 74 extending from the pinion gear 72. The actions and advantages are similar to those of Embodiments 1 and 2.

Figure 2:
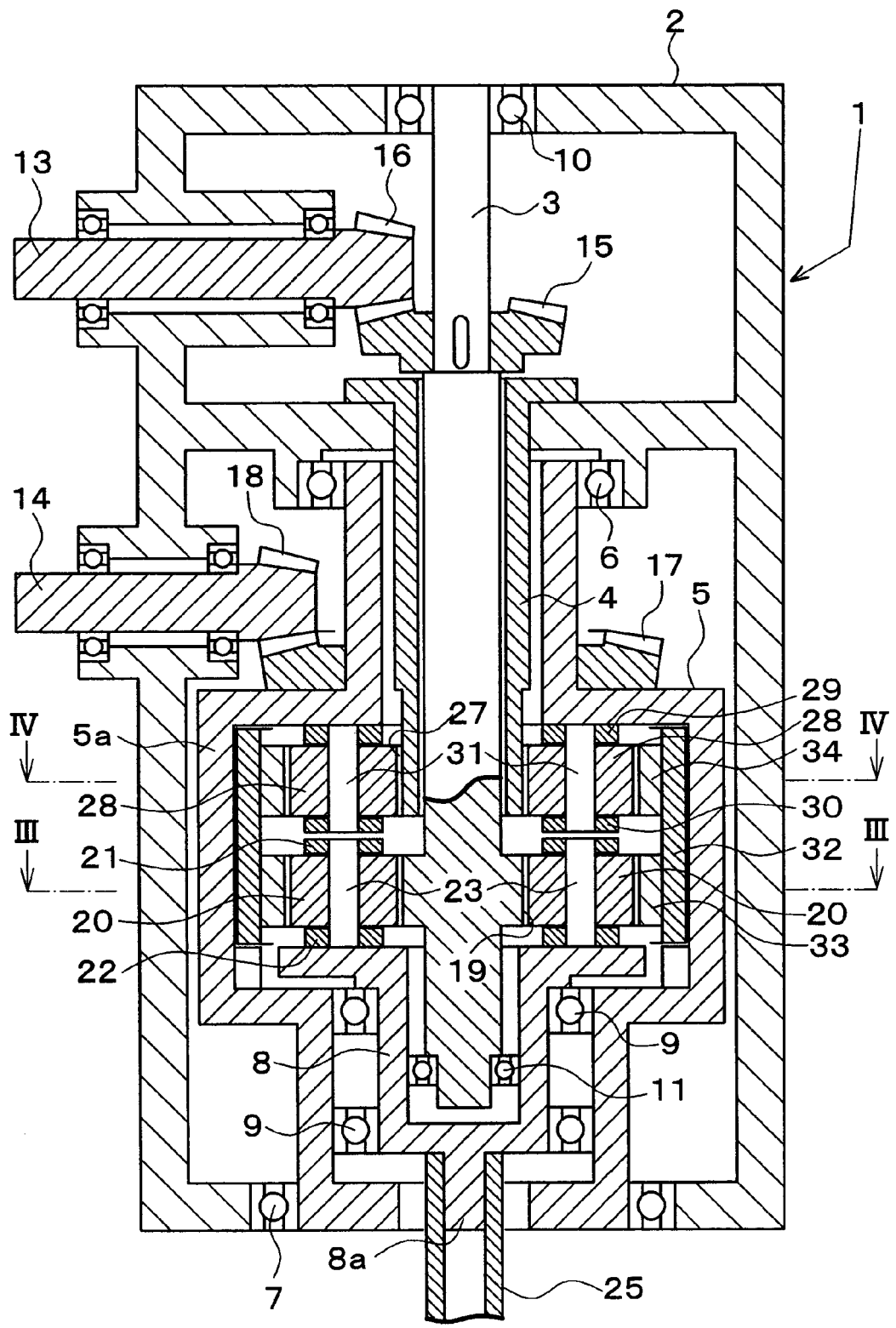
FIG. 2 is a cross-sectional view of the same power transmission device.
Figure 3:
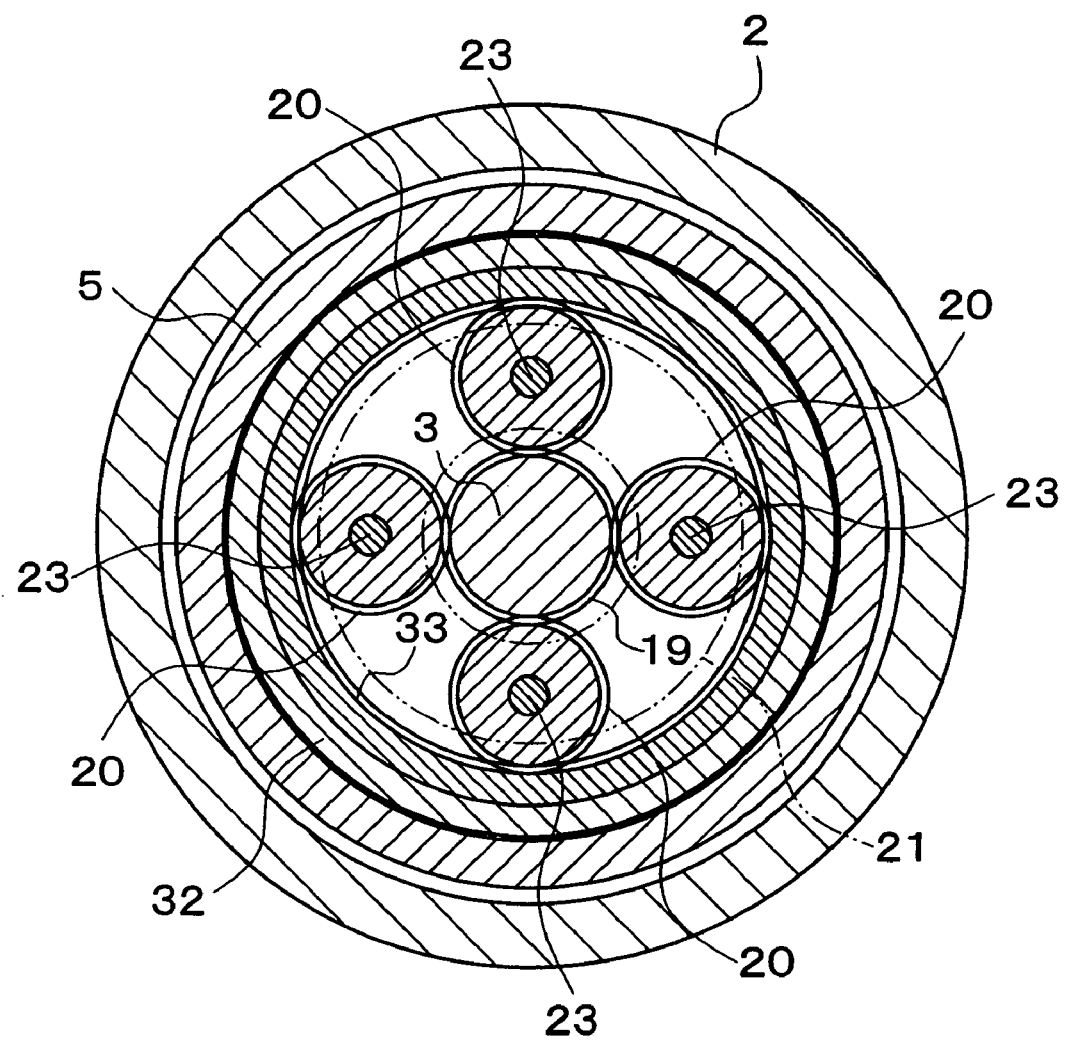
FIG. 3 is across-sectional view taken along the line III—III of FIG. 2.
Figure 4:
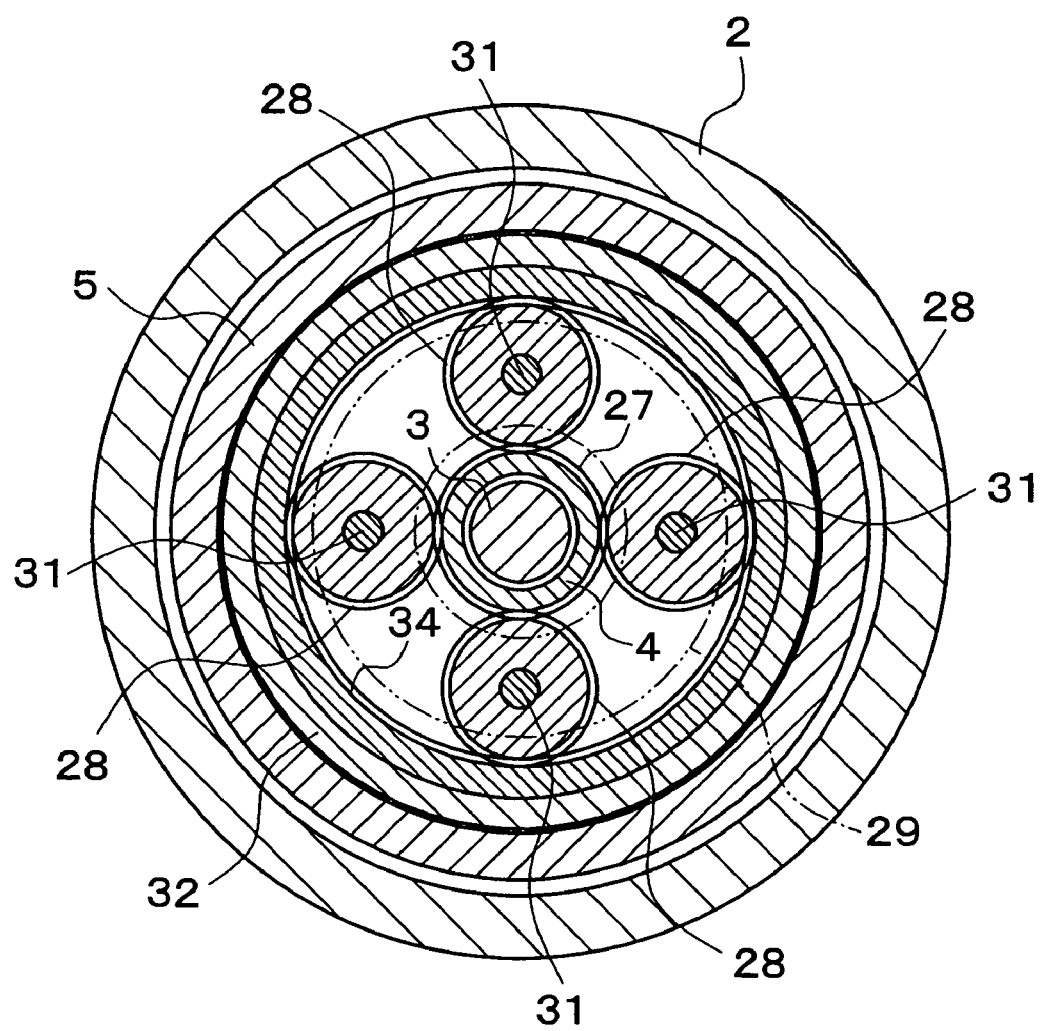
FIG. 4 is a cross-sectional view taken along the line IV—IV of FIG. 2.

Here, the present invention should not be limited to the aforementioned embodiments but can be suitably modified and embodied without departing from the gist of the invention, as following examples:

(1) In the power transmission device shown in FIG. 1 and FIG. 2, the rotating input shaft 13 is disposed coaxially with the transmission shaft 3;

(2) In the power transmission device shown in FIG. 1 and FIG. 2, the turning input shaft 14 is arranged in a direction different from that of the rotating input shaft 13; and (3) The number of the first planetary gear 20 shown in FIG. 1 and FIG. 2 and the number of second planetary gear 28 shown in FIG. 3 are individually modified into one, two, three and five. However, this number is preferably two or more, because the vibrations are serious for one.

What is claimed is:

1. A power transmission device comprising:
    a turning body and a transmission shaft being supported at a housing so as to be relatively coaxially rotatable;
    one shaft of an input shaft and an output shaft being connected to said transmission shaft;
    a first sun gear being fixed on said transmission shaft;
    a first planetary gear meshing with said first sun gear, said first planetary gear being supported at a rotating body;
    a second sun gear being fixed on said housing;
    a second planetary gear meshing with said second sun gear, said second planetary gear being supported at said turning body;
    a first inner gear meshing with said first planetary gear and a second inner gear meshing with said second planetary gear, said first and second inner gears being corotatably connected to each other;
    the other shaft of said input shaft and said output shaft being connected to said rotating body; and
    a rotating shaft being generally perpendicularly connected to said other shaft through a change-direction transmission member, wherein
    said rotating shaft and said other shaft are supported at an integral turning member which turns integrally with said turning body.

2. A power transmission device as set forth in claim 1, wherein said one shaft is supported at said housing perpendicularly to a relative rotation axis of said transmission shaft and said turning body.

3. A power transmission device as set forth in claim 1, wherein said one shaft is supported at said housing in parallel with a relative rotation axis of said transmission shaft and said turning body.

4. A power transmission device as set forth in claim 1, wherein the turning body is supported on the inner side of said housing.

5. A power transmission device as set forth in claim 1, wherein the turning body is supported coaxially with said housing.

6. A power transmission device as set forth in claim 1, wherein the transmission shaft is inserted into the inner side of said turning body; and said first sun gear, said first planetary gear, said rotating body, said second sun gear, said second planetary gear, said first inner gear and said second inner gear are arranged on the inner side of said turning body.

7. A power transmission device as set forth in claim 6, wherein a hollow-cylindrical shaft is fixed on said housing; said hollow-cylindrical shaft is inserted on the outer side of said transmission shaft and on the inner side of said turning body; and said second sun gear is fixed on said hollow-cylindrical shaft.

8. A power transmission device as set forth in claim 7, wherein said first sun gear and said first planetary gear are juxtaposed to each other in the axial direction of said turning body so that said first planetary gear and said second planetary gear are juxtaposed to each other in the axial direction of said turning body, and said first inner gear and said second inner gear are juxtaposed to each other in the axial direction of said turning body.

9. A power transmission device as set forth in claim 1, wherein said integral turning member is a casing which covers said rotating shaft and said other shaft.

10. A power transmission device as set forth in claim 1, wherein said integral turning member is a casing.

* * * * *